Oct. 13, 1959
M. M. ARLIN
2,908,406
ELECTRICALLY CONTROLLED FEEDING APPARATUS
Filed June 1, 1954
2 Sheets-Sheet 1
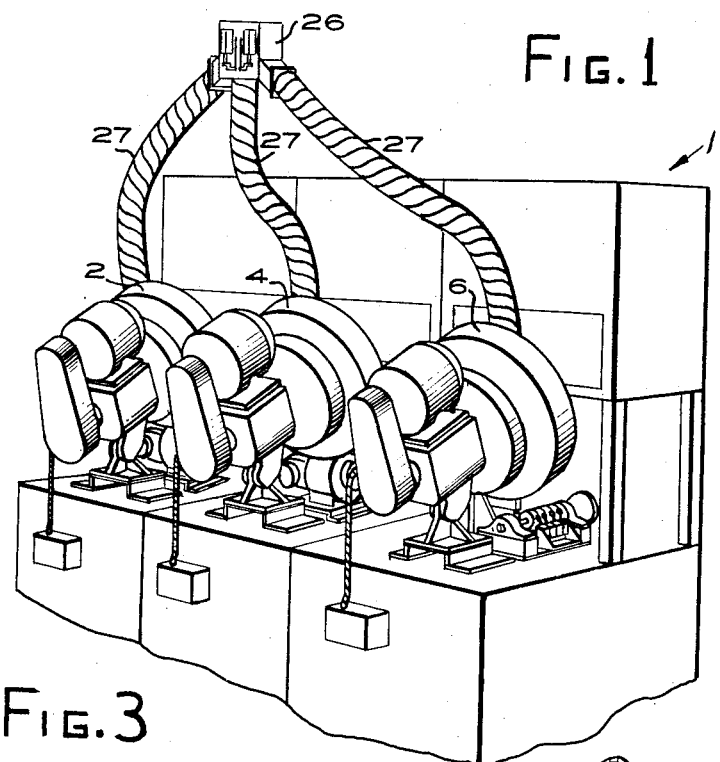
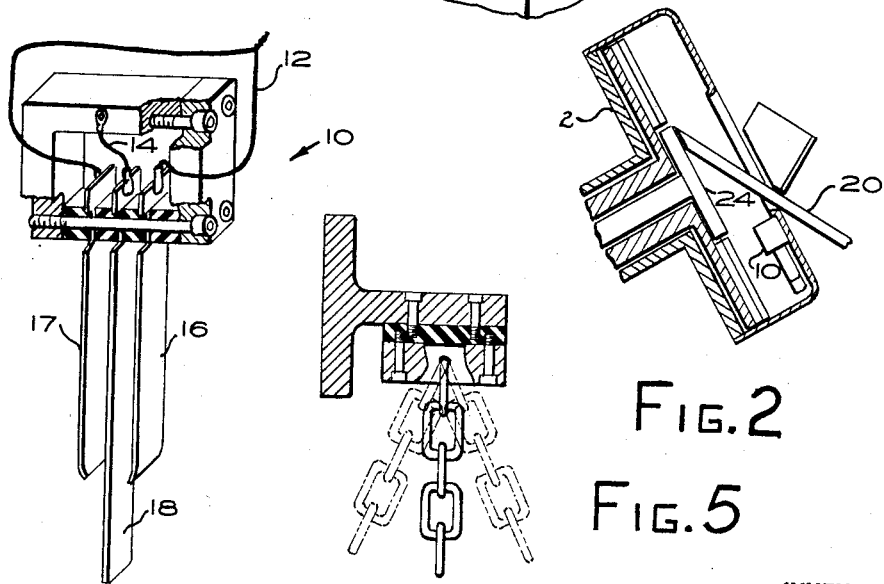
INVENTOR.
MAX M ARLIN
BY *John L. Stoughton*
*his attorney*

Oct. 13, 1959 M. M. ARLIN 2,908,406
ELECTRICALLY CONTROLLED FEEDING APPARATUS
Filed June 1, 1954
2 Sheets-Sheet 2

INVENTOR.
MAX M. ARLIN
BY John L. Stoughton
his attorney

United States Patent Office 2,908,406
Patented Oct. 13, 1959

2,908,406

ELECTRICALLY CONTROLLED FEEDING APPARATUS

Max M. Arlin, Huntington Woods, Mich., assignor to John D. MacArthur, Chicago, Ill.

Application June 1, 1954, Serial No. 433,686

18 Claims. (Cl. 214—17)

The present invention relates generally to electrically controlled feeding apparatus and is particularly adapted, among other uses, as a control system for controlling the automatic feeding of parts to a machine for performing an operation on the parts supplied thereto.

Because of the present cost of labor, more and more manufacturing operations are being done on an automatic basis in which the various operational performing machines operate automatically to do their various tasks. If the full labor saving advantages of these machines are to be realized, it is desirable that the parts which are to be processed thereby be automatically gauged and fed to the respective machines. If these parts are required to be processed in more than one machine, it is important that there be a smooth flow of parts through all of the machines. In modern day manufacture, all of the manufactured parts must be held within close tolerances so that the parts may be used interchangeably or at least sorted into groups in which any part in any one group may be used interchangeably with any other part in the same group. Modern machines, while having been developed to a high degree, do not always produce parts of exactly the same characteristics and it is expected that a variable number of parts will be unacceptable for any use whatsoever and must be discarded. It has become common practice to inspect parts at various stages of manufacture so that the unacceptable parts may be discarded without further processing. The uncertainty of the number of parts which may have to be discarded at the various manufacturing stages makes it almost impossible to set up a series of automatic machines for automatically feeding parts one to the other, and in which the output of satisfactory parts from a preceding machine is in exact step with the demand of the subsequent machine.

It is an object of this invention to provide an electrically controlled apparatus for controlling the feeding of parts to and/or from a part containing hopper or conveyor belt system.

A further object is to provide such an apparatus which will control the supplying of parts to such a hopper or belt to maintain a desired quantity of acceptable parts therein at all times.

Another object is to provide such an apparatus for controlling the supply of acceptable parts to a plurality of hoppers, belts, etc., from a common supply bin.

A still further object is to provide such an apparatus which may be associated with a part feeding hopper in which the parts are continually agitated and which is provided with timing means to prevent a controlling operation thereof should the agitator temporarily move the parts out of operative relation with the sensing element.

A still further object is to provide such a control which will supply such parts in predetermined fixed quantities at the required frequency.

Other objects will be apparent from the specification, the hereinafter appended claims, and the drawings in which;

Figure 1 shows the invention as applied to a plurality of part feeding hoppers supplied with parts from a common source;

Figure 2 is a partial view of one of the hoppers showing the sensing device for sensing the number of parts in such hopper;

Figure 3 is a detailed view of one form of part sensing device for use in the invention;

Figure 4:
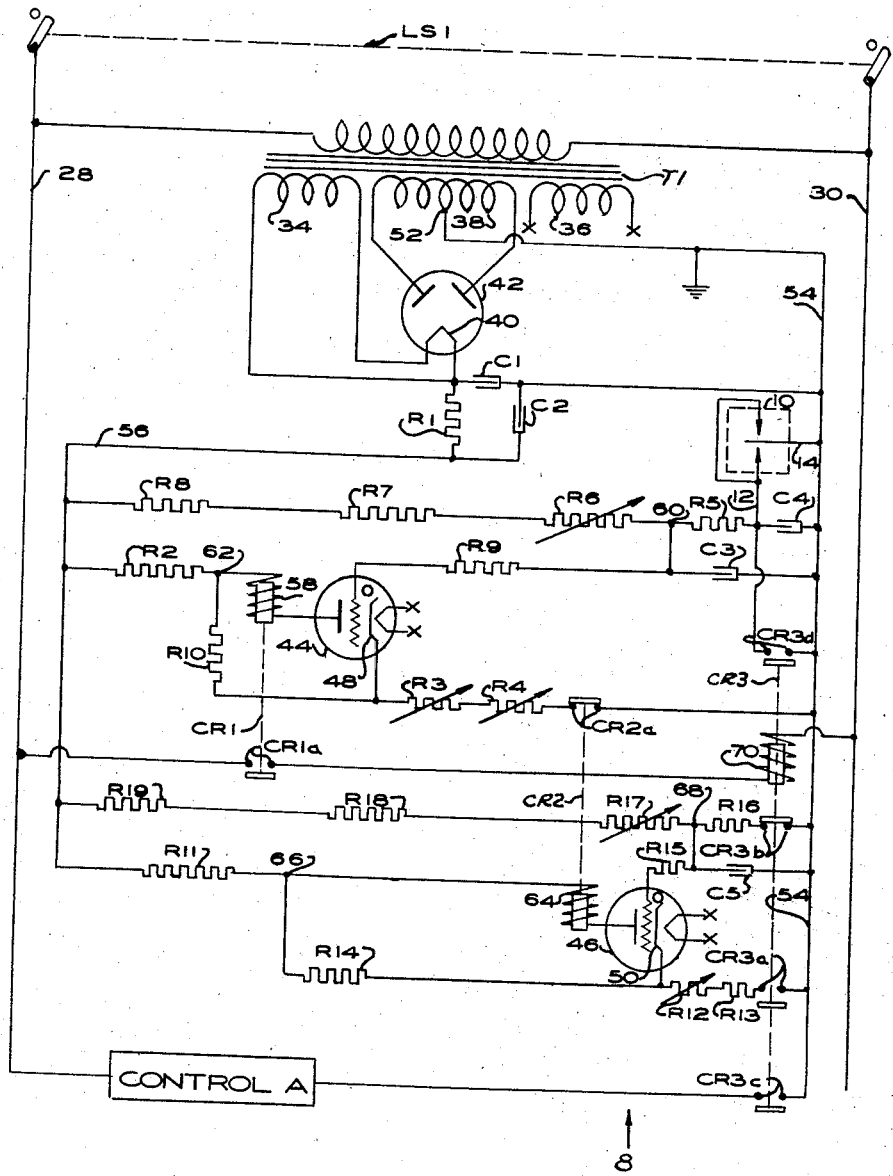
Figure 4 is a schematic view showing the electrical circuit embodying the invention; and, Figure 5 is a view of a modified form of sensing device.

Referring to the drawings by characters of reference, the numeral 1 designates generally any part feeding system for supplying a regulated flow of parts to a plurality of hoppers 2, 4 and 6. Each of the hoppers is provided with an electrical controlling network 8 having a part sensing device 10 located within the respective hopper 2, 4, or 6. The sensing device 10 may be of any suitable construction in which the presence of a suitable quantity of parts in the respective hopper 2, 4 or 6 will close a circuit between the conductors 12 and 14. This may be accomplished either by a circuit established through such parts when the level thereof is at or above the desired level, by the closing of a switch in response to such desired quantity of parts, or any other suitable mechanism.

As shown in Figure 3, the device 10 may take the form of a plurality of strip members 16, 17, and 18 respectively. When a suitable quantity of parts is within in the respective hopper, the rotating parts will flex the grounded strip member 18 into contact with one of the energized strip members 16 or 17 to complete a circuit between the conductors 12 and 14. Because of the rotation of the rotatable part feeding device 24 of the respective hopper for feeding the parts into the feed trough 20 the parts may be so agitated that the strip members 16 or 17 do not maintain a continual closed circuit with the strip member 18 and the circuit between the conductors 12 and 14 may momentarily open and close, as will be described in connection with the description of Figure 4. Unless the circuit between conductors 12 and 14 remains open for a sufficiently long interval, which is indicative of a lesser quantity of parts than desired, the controlling network 8 will not actuate to cause the part supplying device 26 to supply more parts to the respective hopper. The means 26 is selectively operable to permit a flow of parts through the proper one of the tubes 27 to supply parts to the respective one of the hoppers 2, 4 or 6 which requires the same. The "control A" represents diagrammatically one of the energizing elements of the device 26.

Referring to Figure 4, the network 8 is energized from a suitable source of electrical energy such as a conventional alternating potential supply through a disconnect switch LS–1 which when closed energizes a pair of conductors 28 and 30 which supplies energy for the main control relay CR3, the "control A" and a transformer T1. The transformer T1 has a plurality of secondary windings 34, 36 and 38. The winding 34 supplies potential for rendering the cathode 40 of a dual anode rectifying valve 42 in an emissive condition. The winding 36, as shown by the characters x—x at its terminals and characters x—x on the heater connection of the vapor or gas filled valves 44 and 46 supply electrical energy for rendering the cathodes 48 and 50 thereof in an emissive condition. The winding 38 has end terminals connected to the anodes of the valve 42 and a center tap 52 which may be grounded to the metal chassis upon which the various parts of the network 8 may be assembled, and which chassis forms the bus 54. The usual smoothing capacitors C1 and C2, and resistor R1 are utilized to provide a relatively constant rectified direct current potential between a positive bus 56 and the negative chassis or bus 54.

The anode of valve 44 is connected to the bus 56 through an energizing winding 58 of control relay CR1 and a current limiting resistor R2. The cathode of valve 44 is connected through variable resistors R3 and R4, and normally closed contacts CR2a of relay CR2 to the negative bus 54. The conductive condition of the valve 44 is under control of the sensing device 10, the capacitor C3, and timing resistor R6. The circuit by which this is accomplished comprises a voltage splitting device shown as comprising resistors R5, R6, R7, and R8 connected in series with the sensing device 10 between the busses 54 and 56. The grid of valve 44 is connected through a grid current limiting resistor R9 to the junction 60 between the resistor R5 and variable timing resistor R6. The capacitor C3 is connected between junction 60 and the bus 54 whereby it is in parallel circuit with the series connected device 10 and resistor R5. A capacitor C4 may be connected in parallel with the device 10, if desired.

With the above construction the potential of the grid of valve 44 with respect to that of the bus 54 will be determined by the device 10. When device 10 is in open circuit position (indicative of less than the desired number of parts in the hopper), the charge on the capacitor C3 will increase at a rate determined, at least in part, by the magnitude of the resistance of the resistor R6. As the charge on the capacitor C3 increases, the potential of the junction 60 will rise above that of the bus 54 and if the device 10 remains open circuited for a long enough interval the potential of junction 60 will approach that of the bus 56. The potential of the cathode 48 of valve 44 (during non-conducting periods of valve 44) with respect to bus 54 is determined by the resistors R2, R3, R4, the condition of the contacts CR2a and a resistor R10 which is connected between the junction 62 of the resistor R2 and winding 58 and the end of resistor R3 which is connected to the cathode of valve 44. With the valve 44 non-conducting and contacts CR2a closed, the potential of the cathode 48 with respect to the bus 54 will be determined by the relative values of the resistors R2, R3, R4 and R10 and, within wide limits, may be varied by changing the magnitudes of the resistances of the resistors R3 and R4.

The valve 46 is connected between the busses 54 and 56 similarly to the valve 44. Its anode is connected through winding 64 of control relay CR2 and current limiting resistor R11 to the positive bus 56, its cathode 50 is connected through variable resistors R12 and R13 and normally open contacts CR3a of relay CR3 to negative bus 54. A resistor R14 is connected between the junction 66 of resistor R11 with winding 64 and the end of resistor R12 which is connected to the cathode 50. The grid of valve 46 is connected through a grid current limiting resistor R15 to a junction 68 between the resistors R16 and R17. The resistors R16 and R17 correspond to resistors R5 and R6. The end of resistor R16 opposite to junction 68 is connected through normally closed contacts CR3b of relay CR3 to bus 54. The end of resistor R17 opposite to that connected to junction 68 is connected through resistors R18 and R19 to bus 56. A capacitor C5 is connected in parallel with the series connected resistor R16 and contacts CR3b. The potential of the grid of valve 46 with respect to the cathode 50 will, therefore, be controlled by the contacts CR3b in the same manner as the potential of the grid of valve 44 is controlled with respect to the cathode 48 by the sensing device 10.

The energizing winding 70 of relay CR3 is connected between the conductors 28 and 30 through the normally open contacts CR1a of the relay CR1 while the control device "Control A" is connected between the conductors 28 and 30 through contacts CR3c which may be either of the normally open or the normally closed types, as may be required for the proper operation of the device controlled by "Control A".

It is believed that the remainder of the details of the invention may best be set forth by a description of the operation of the invention which is as follows:

Upon closure of the line switch LS1, the conductors 28 and 30 are energized to supply potential to the transformer T1 whereby the windings 34 and 36 are energized to bring the valves 42, 44 and 46 into an operating condition. With valve 42 operating, a direct current potential is applied between the busses 54 and 56. Assuming that the number of parts in the hopper, with which the device 10 is associated, is below the minimum desired number, the circuit therethrough will be open and the charge on the capacitor C3 will increase at a rate primarily determined by the value of the resistor R6, thereby progressively raising the potential of the grid of valve 44 with respect to that of bus 54. This time interval may vary widely but in many instances may be in the neighborhood of a few seconds, as for example 3 to 15 depending upon the type of parts and type of hopper used. At this time the contacts CR2a are closed and the potential of the cathode 48 is at a fixed potential above that of the bus 54. After a predetermined desired time interval the charge on capacitor C3 will be sufficiently increased to place a grid to cathode bias on valve 44 of a magnitude to cause conduction thereof. When valve 44 conducts, it energizes relay CR1 to cause its contacts CR1a to close to complete the energizing circuit for the relay CR3 which thereupon closes its normally open contacts CR3a, CR3c and CR3d and opens its normally closed contacts CR3b.

Opening of contacts CR3b permits the capacitor C5 to commence charging to increase the potential of the grid of valve 46 with respect to bus 54. Closure of the contacts CR3a completes the anode-cathode circuit for valve 46 and also places the potential of its cathode 50 at a fixed potential above that of the bus 54. Closure of contacts CR3c will energize "Control A" to actuate the device 26 to cause parts to be supplied through the respective one of the tubes 27 to the hopper associated with the respective said sensing device 10. Closure of contacts CR3d closes a discharge circuit for the capacitor C3 through resistor R5 whereby capacitor C3 is quickly discharged and the grid of valve 44 is lowered to a non-conducting bias. Since, however, the valve 44 is of this discontinuous control type and is supplied with direct current, the valve 44 continues to conduct. The discharge rate of capacitor C3 is high and will be completely discharged long before the contacts CR3d can be reopened by conduction of valve 46, as will be described below.

The timing afforded by capacitor C5 and resistor R17 is preferably substantially longer than that afforded by resistor R6 and capacitor C3, and provides a time interval in which parts are supplied to the hopper associated with this control circuit. The timing may vary widely from seconds to minutes depending upon the rate at which parts are supplied during this interval and the size of the hopper. At the end of this period the potential of the grid of valve 46 will have been increased sufficiently with respect to the cathode 50 to cause valve 46 to conduct. When valve 46 conducts, it energizes the winding 64 of relay CR2, whereby its contacts CR2a open to break the anode-cathode circuit of valve 44. This terminates the conduction of valve 44 and relay CR1 is thereby deenergized to open its contacts CR1a. Opening of contacts CR1a deenergizes winding 70 of relay CR3 whereby its contacts CR3b close and its contacts CR3a, CR3c and CR3d open.

Closure of contacts CR3b completes a discharge circuit for the capacitor C5 through the discharge resistor R16 whereby the potential of the grid of valve 46 is lowered to a non conducting bias. Since, however, valve 46 is of the discontinuous control type it continues to conduct. The discharge rate of capacitor C5 is high and will be completely discharged before any subsequent reconduction of valve 44.

Opening of contacts CR3a opens the anode-cathode circuit of valve 46 and deenergizes the relay CR2 to cause its contacts CR2a to close, but valve 44 cannot immediately reconduct even though device 10 is not satisfied because of the timing afforded by the resistor R6 and capacitor C3. Opening of contacts CR3c actuates "Control A" to its original condition and opening of contacts CR3d places the conduction of valve 44 again under control of the device 10. If the quantity of parts is sufficient to satisfy device 10 (keep its contacts closed) then the part supplying operation is completed. If, however, the device 10 is not satisfied, then its contacts will be open and another predetermined quantity of parts will be supplied in the manner above described.

It will be understood from the foregoing description that the control device will supply predetermined quantities of parts to the controlled hopper each time the parts in such hopper is below a desired quantity, and that the frequency of the supplying of such predetermined quantities will be determined by the demand rate of such hopper.

While only the preferred form of the invention has been illustrated in accordance with the requirement of the patent statutes, it will be apparent that various modifications may be made therein and the scope of the invention therefore is to be determined by the scope of the hereinafter appended claims.

What is claimed and is desired to be secured by United States Letters Patent is as follows:

1. In an electrical timing network, a first and a second timing device, a controlling circuit, an actuating device for controlling said first timing device and having a first and a second controlling position, said actuating device being effective in said first controlling position to initiate the timing out of said first timing device and effective in said second position to reset said first timing device, said first timing device being operable to perform its timing function solely when said actuating device is in its said first position, means actuated by said first timing device at the end of said interval for actuating said controlling circuit and for initiating the operation of said second timing device and for resetting and maintaining said first timing device in its initial condition, said second timing device being operable at the end of a second time interval subsequent to its initiation for returning said controlling circuit to its initial condition and rendering said first timing device responsive to said actuating device, and each of said which is actuated by each said timing device comprising a discontinuous control type electrical valve and a source of unidirectional potential for energizing said valves.

2. In combination, a pair of electrical networks, each said network including a current responsive element and an electric valve and a bias controlling circuit, each said bias controlling circuit including an energy storage device and a device for regulating the rate of change of stored energy in said storage device, each said valve including a pair of main electrodes and a control electrode, means to apply a source of unidirectional potential between said main electrodes of each of said valves to energize said valves, each said network further including circuit means for connecting its said storage device to apply a potential between said control electrode and one of said main electrodes of its said valve, each said networks including an energy transfer circuit regulating the magnitude of energy stored in its said storage device and operable in a first controlling condition to change the magnitude of said stored energy from a first value to a second value whereby the current flow between said main electrodes of its said valve is changed from a first value to a second value, current responsive means responsive to the change in magnitude of said current flow between said main electrodes of said valve of a first of said networks to initiate an operation of said energy transfer circuit of the second of said networks from its first to its second value and to actuate a control circuit, said last-named circuit responsive means also being effective to effect a change in said energy stored in said energy storage device of said first network from said second to said first value and independent of its respective said energy transfer circuit, and current responsive means responsive to the change in magnitude of said current flow between said main electrodes of said valve of said second network to effect a change in said stored energy in said energy storage device of said second network from its said second to its said first value and to render said energy transfer circuit of said first network effective.

3. In an electrical network, a first and a second discontinuous control type electric valve, each said valve having a pair of main electrodes and a control electrode, a pair of terminals adapted to be energized from a source of direct potential energy, a first and a second relay, each of said relays having an energizing winding, a first main electrode circuit connected between said source terminals and including said main electrodes of said first valve and said energizing winding of said first relay, a second main electrode circuit connected between said source terminals and including said main electrodes of said second valve and said energizing winding of said second relay, a first bias controlling circuit connected between said terminals and including a first energy storage device and a first device for regulating the rate of change of energy stored in said first storage device, a first bias applying circuit for applying a bias potential, derived from said first bias controlling circuit, between said control electrode and one of said main electrodes of said first valve, a second bias controlling circuit connected between said terminals and including a second energy storage device and a second device for regulating the rate of change of energy stored in said second storage device, a second bias applying circuit for applying a bias potential, derived from said second bias controlling circuit, between said control electrode and one of said main electrodes of said second valve, means responsive to an energized condition of said first relay for rendering said second bias controlling circuit effective to change the energy stored in said second storage device from a first value to a second value in which said second valve is rendered conductive, means responsive to an energized condition of said second relay for terminating the conduction through said first main electrode circuit, and means responsive to a deenergized condition of said winding of said first relay for preventing conduction through said second main electrode circuit and responsive to an energized condition of said winding to render said second main electrode circuit responsive to the conductive condition of said second valve.

4. The combination of claim 3 in which said first rate regulating device comprises a resistor connected in series circuit with said first energy storage device, said first bias applying circuit derives its said bias potential from said first storage device, said second rate regulating device comprises a resistor connected in series circuit with said second energy storage device, and said second bias applying circuit derives its said bias potential from said second storage device.

5. The combination of claim 4 in which said first relay acts in response to an energized condition of its said winding to discharge said first storage device and acts in response to a deenergized condition of its said winding to discharge said second storage device.

6. In an electrical network, a plurality of terminals adapted to be supplied with direct potential energy; a first bias potential controlling circuit connected to receive energy from said terminals and having in series circuit a first bias resistor and a first capacitor; a first switch means in parallel circuit with said capacitor; a first main electrode circuit connected to receive energy from said terminals and including the main electrodes of a first normally blocked discontinuous control type electric valve, the energizing winding of a first control relay, a first anode resistor, and normally closed contacts controlled by a normally deenergized second relay; said first valve having a control electrode; a first bias potential applying circuit for applying a bias potential between said control electrode and one of said main electrodes of said first valve and including said normally closed contacts; said first bias applying circuit being connected to be energized by the potential across said first capacitor; a resistor connected in parallel with said main electrodes of said first valve; a second bias potential controlling circuit connected to receive energy from said terminals and having in series circuit a second bias resistor and a second capacitor; a second main electrode circuit connected to receive energy from said terminals and including the main electrodes of a second normally blocked discontinuous control type electric valve, the energizing winding of a second control relay, a second anode resistor, and normally open contacts controlled by said normally deenergized first relay; a resistor connected in parallel with said main electrodes of said second valve; said second valve having a control electrode; a second bias potential applying circuit for applying a bias potential between said control electrode and one of said main electrodes of said second valve and including said normally open contacts; said second bias applying circuit being connected to be energized by the potential across said second capacitor; normally closed contacts connected across said second capacitor and opened as a consequence of the energization of said first relay; and normally open contacts connected across said first capacitor and closed as a consequence of the energization of said first relay.

7. An electrical controlling network for controlling the flow of articles comprising a first and a second discontinuous control type electric valve, each said valve having a pair of main electrodes and a control electrode, a first circuit including said main electrodes of said first valve and a first current responsive device and a first normally closed switch, a second circuit including said main electrodes of said second valve and a second current responsive device and a second normally open switch, means operatively connecting said first current responsive device with said second switch whereby said second switch is moved to closed position as a consequence of increased current flow through said first current responsive device, means operatively connecting said second current responsive device with said first switch whereby said first switch is moved to open position as a consequence of increased current flow through said second current responsive device, a first potential circuit connected to apply a bias potential between said control electrode and one of said main electrodes of said first valve, said potential circuit including a timing device, a first potential controlling means for controlling said timing device and responsive to the presence of the articles to be controlled by the network to initiate a timing operation thereof, a second potential controlling means controlling said timing device and operatively associated with said second circuit to reset said timing device as a consequence of an increased current flow therein, a second potential circuit connected to apply a bias potential between said control electrode and one of said main electrodes of said second valve, said second potential circuit including a second timing device, and means responsive to an increase in current flow through said first circuit for rendering said second-named timing device effective to initiate a timing operation thereof, and said first and second circuits including a source of unidirectional potential connected between said main electrodes of each of said valves.

8. An electrical timing network comprising a pair of conducting elements adapted to be energized from a unidirectional potential source, a current regulating device serially arranged with a first impedance means and connected between said elements, an electric valve having a pair of main electrodes and a control electrode, a first electrical relay having an energizing winding, a switch, means connecting one of said pair of main electrodes to one of said conducting elements and including said winding, a second impedance means, means connecting the other of said pair of main electrodes to the other of said conducting elements and including said switch, a third impedance means connected in shunt circuit with said main electrodes, an energy storage device connecting said control electrode to said other conducting element, and a potential conducting means connecting said control electrode to an intermediate portion of said first impedance means.

9. In an electrical timing network, a first and a second electrical timing device for measuring timed intervals, means to energize said first and said second timing devices by a source of unidirectional potential, a current controlling device having a first and a second current controlling condition, means connecting said first timing device for actuation by said current controlling device, said first timing device being effective to measure its timing interval solely when said current controlling device is in said first condition, circuit means connecting said first and second timing devices and actuated as a consequence of the completion of said interval by said first timing device to cause said second timing device to initiate and complete the measuring of its said interval.

10. The combination of claim 9 in which there is provided resetting means actuated as a consequence of the completion of said time interval by said first timing device for resetting said first timing device independently of said current controlling device.

11. The combination of claim 9 in which there is provided resetting means actuated by said first timing device as a consequence of the timing out of its said interval to reset said first timing device.

12. The combination of claim 11 in which said resetting means is connected to said current controlling device and renders said current controlling device ineffective to cause said first timing device to measure its timing interval.

13. The combination of claim 12 in which there is provided means connecting said second timing device to said resetting means and effective as a consequence of the timing out of said second timing device to render said current controlling device effective.

14. In a timing network, a plurality of terminals adapted to be supplied with a unidirectional electrical potential, first and second electric valves each having a pair of main electrodes and a control electrode, means connecting said main electrodes of said first valves between a pair of said terminals, means connecting said main electrodes of said second valve between two of said terminals, a timing network comprising a pair of series connected impedance elements one of which is reactive in nature, means for connecting said timing network across a source of electrical energy, said timing network having one end terminal connected to one of said main electrodes of said first valve, means connecting the common connection between said elements of said timing network to said control electrode of said first valve, a current regulating device connected to control the energized condition of one of said impedance elements of said timing network and having a first and a second current regulating condition whereby said regulating device in said first condition causes a timed change in the reactive energy stored in said reactive impedance of said timing network from a normal to a second amount and in said second condition causes said stored energy to return to said normal amount, said first valve having a first conducting condition when said stored energy is said normal amount and a second conducting condition when said stored energy is said second amount, a current actuated device responsive to current flow through said first valve and effective when said first valve is rendered in said second condition to render said current regulating device ineffective, a second timing network actuated by said first valve when it is rendered in its said second condition to time out a measured interval, and means responsive to the completion of said last named measured interval to render said current regulating device effective.

15. The combination of claim 14 in which said second timing network comprises a pair of series connected impedance elements one of which is reactive in nature, in which there is provided means for connecting one end terminal of said second timing network to one of said main electrodes of said second valve and the common terminal between said last named elements to said control electrode of said second valve.

16. The combination of claim 15 in which said one main electrodes are cathodes, said reactive elements are capacitors, said capacitors are connected respectively between said one end terminals and said common terminals, and said current actuated device is a relay.

17. In a system for controlling the quantity of material in a container, loading means for supplying material to the container at a preselected rate, control means effective when actuated to energize said loading means for a preselected constant period of time, sensing means engageable by the material in the container whenever the material is present in the container in excess of a preselected quantity and effective to present an output indication at all times except when engaged by the material, and means including timing means effective only after said output indication has been presented for a preselected period of time for actuating said control means.

18. In a system for controlling the quantity of material in a container, loading means for supplying material to the container at a preselected rate, electrical control means including first electrical timing means effective each time it is actuated to energize said loading means for a preselected constant period of time, electro-mechanical sensing means including means engageable by the material in the container whenever the material is present in the container in excess of a preselected quantity and effective to transmit an electrical output signal at all times except when engaged by the material, and means including second electrical timing means effective only after said output signal has been transmitted for a preselected period of time for actuating said electrical control means.

References Cited in the file of this patent

UNITED STATES PATENTS

| | | |
|---|---|---|
| 1,501,622 | Ruau | July 15, 1924 |
| 1,901,663 | Minkler | Mar. 14, 1933 |
| 2,390,981 | Bivens | Dec. 18, 1945 |
| 2,422,020 | Kingsmill | June 10, 1947 |
| 2,492,749 | Hills | Dec. 27, 1949 |
| 2,529,843 | Kehrer | Nov. 14, 1950 |
| 2,552,137 | Bivens | May 8, 1951 |
| 2,618,395 | Brabander | Nov. 18, 1952 |
| 2,620,933 | Lankford et al. | Dec. 9, 1952 |
| 2,753,061 | Trainer | July 3, 1956 |